United States Patent
Harlin et al.

(10) Patent No.: US 6,476,161 B1
(45) Date of Patent: Nov. 5, 2002

(54) METHOD AND APPARATUS FOR PREPARING POLYMERS

(75) Inventors: Ali Harlin, Vantaa; Jouni Kivelä, Helsinki; Esa Korhonen; Henrik Andtsjö, both of Porvoo, all of (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/554,580

(22) PCT Filed: Nov. 17, 1998

(86) PCT No.: PCT/FI98/00905

§ 371 (c)(1),
(2), (4) Date: Jul. 17, 2000

(87) PCT Pub. No.: WO99/25741

PCT Pub. Date: May 27, 1999

(30) Foreign Application Priority Data

Nov. 17, 1997 (FI) .................................................. 974262

(51) Int. Cl.[7] .............................. C08F 2/14; B01J 8/18
(52) U.S. Cl. ............................ 526/65; 526/64; 526/88; 526/901; 526/920; 422/132; 422/134; 422/139; 422/140
(58) Field of Search .............................. 525/53; 526/64, 526/65, 88, 901, 920; 422/132, 134, 139, 145, 140

(56) References Cited

U.S. PATENT DOCUMENTS

| | | | |
|---|---|---|---|
| 4,368,291 A | | 1/1983 | Frese et al. |
| 4,692,501 A | * | 9/1987 | Mineshima et al. .......... 526/65 |
| 4,740,551 A | | 4/1988 | Foster |
| 6,056,927 A | * | 5/2000 | Chinh et al. ................. 422/139 |

FOREIGN PATENT DOCUMENTS

| | | |
|---|---|---|
| WO | A1-8802376 | 4/1988 |
| WO | A1-9517952 | 7/1995 |

* cited by examiner

*Primary Examiner*—Fred Teskin
(74) *Attorney, Agent, or Firm*—Birch, Stewart, Kolasch & Birch, LLP

(57) ABSTRACT

The present invention concerns a method and an apparatus of introducing polymer slurry obtained from a slurry reactor into a gas phase reactor containing a fluidized bed (C, D). According to the present invention, the content of the slurry reactor (R1) is conducted directly to the fluidized bed reactor (R2) as a multiphase stream comprising polymer, active catalyst and reaction medium using at least one feed line (10; 11; 12), and the stream is fed below a first fluidized zone (C) of the gas phase reactor via inlet pipe protruding into the fluidized bed in order to increase the once-through conversion of the process. By means of the invention, the amount of unreacted monomers which needs to be recirculated is minimized and investment and operation costs of the recovery section are greatly reduced.

42 Claims, 1 Drawing Sheet

METHOD AND APPARATUS FOR PREPARING POLYMERS

This application is the national phase under 35 U.S.C. §371 of PCT International Application No. PCT/FI98/00905 which has an International filing date of Nov. 17, 1998, which designated the United States of America.

BACKGROUND OF THE INVENTION

1. Field of the Invention

The present invention relates to polymerization of olefinic monomers. Generally, the present invention concerns a process for preparing homopolymers and copolymers of ethylene and propylene or other olefins in a reactor system comprising a combination of at least one slurry reactor and at least one gas phase reactor. In particular, the present invention concerns a method and an apparatus for introducing a polymer slurry comprising a multiphase flow into the fluidized bed of a gas phase polymerization reactor.

2. Description of Related Art

A large number of bulk and gas phase processes for preparing ethylene and propylene homo- and copolymers are known in the art. Also combined bulk and gas phase processes have already been suggested in the prior art, Thus, U.S. Pat. No. 4,740,550 discloses polymerization of propylene in a loop reactors, which can be operated in supercritical conditions. The product of the loop reactor is conducted to a gas phase reactor, wherein the reaction is continued. Before entering the gas phase, the fines fraction of the polymerization product of the loop reactor is removed and fully or partially circulated back to the loop reactor. Together with the fines, a part of the unreacted monomers from the gas phase reactor is recycled directly to the first stage loop reactor.

The main object of U.S. Pat. No. 4,740,550 is to provide a process for preparing a block copolymer of high quality by feeding homopolymer with narrow residence time distribution to the block copolymerization stage.

One problem with the process in U.S. Pat. No. 4,740,550 is that if all the fines removed from the first stage loop reactor outlet are circulated back to the loop reactor, there is a risk that eventually the loop reactor is filled with inactive dead catalyst or slightly polymerized dead fines. On the other hand if a portion of this fines stream is combined with the product from the last reactor, this might cause inhomogeneity problems in the final product. Still, further, if a portion of said fines stream is collected separately and blended with a separate homopolymer product as also suggested in U.S. Pat. No. 4,740,550, this leads to complicated control systems because the fines streams cannot be controlled. As a consequence, the production split of the reactors and thereafter the composition of the product is unpredictable without the rejection of most of the fines. These features will all contribute to an economically unacceptable operation.

As far as the relative amounts of polymer produced in each of the various polymerization stages are concerned, U.S. Pat. No. 4,740,550 states the following: Regarding the homopolymer portion of the copolymer, the following ranges are most preferred: first stage pipe-loop reactor 70 to 90%, second stage fluidized-bed reactor 30 to 10%. Assuming that a matrix for homopolymers is produced at a rate of 25,000 kg/h, 70% of this is 17,500 kg/h and 30% of this is 7,500 kg/h. Thus, the rate of homopolymerization is 17,500 kg/h in the first stage loop reactor and 7,500 kg/g in the second stage gas phase reactor. This means that if the product from first stage loop reactor is 40 wt-% slurry as stated in U.S. Pat. No. 4,740,550 (after the fines separation in this example calculation), 26,250 kg/h of the reaction liquid, i.e. propylene, enters the second stage with the polymer product from the first stage. As only 7,500 kg/h of propylene is consumed by polymerization in the second stage and as an estimated 2,500 kg/h leaves the second stage with the homopolymer product, this gives an excess of 16,250 kg/g of propylene entering the second stage (26,250 kg/g−(7,500 kg/h+2,500 kg/h)=16,250 kg/h). In the process disclosed in U.S. Pat. No. 4,740,550 this excess amount of propylene is circulated back to the first stage.

The recycling of large amounts of unreacted monomers from the second stage reactor back to the first stage slurry (bulk) reactor increases investment and production costs, prevents independent control of reaction medium composition in the two reactors and slows up grade transitions.

Generally, in the actual practice of multi-step gas phase processes, the known methods suffer from the disadvantage that it is difficult to adjust the molecular weight distribution and/or chemical composition distribution of the resulting olefin polymer composition to the desired values.

As a solution to this problem, it has been proposed to provide a suspension zone for forming a suspension of the catalyst-containing polymer in an easily volatile hydrocarbon medium. For example, a gaseous portion containing a large amount of hydrogen can be easily separated from solid portion containing the polymer. The separated gaseous phase can be advantageously recycled directly to the first gas phase polymerization zone. Moreover, the heat of polymerization can be advantageously removed by the vaporization of the easily volatile hydrocarbon, EP-A 0 040 992. However, the suggested solution suffers from the technical problem of how to transfer the polymer from the first gas phase into the suspension zone and form the suspension.

The operation of the solution process is difficult, since transportation of the polymer solution as the reaction medium and separation of the polymer contained therein is difficult. This requires special technical solutions making the process economically expensive.

A way of controlling the MWD and the chemical composition is to use suspension polymerisation, wherein a gaseous portion is recycled to the first gas phase reactor. Typically, the reaction medium from the first reactor is recycled to the first reactor.

It should also be noted that in U.S. Pat. No. 4,740,550 discussed above, no particular attention has been attached to the introduction of the slurry from the bulk polymerization into the gas phase reactor.

The present invention aims at eliminating the problems related to the prior art and to improve the operation of combined bulk and gas phase processes by controlling the introduction of the slurry into the gas phase reactor. Before addressing this matter in more detail, some comments on conventional gas phase technology should be made:

As is well known in the art, conventional fluidized gas phase reactors comprise an elongated reactor body generally having a central axis which is vertical. The monomers are polymerized in a fluidized bed supported above a fluidization grid in the lower part of the reactor body. A gaseous stream containing unreacted monomers is recovered from the top of the reactor body and recycled to the fluidized bed, whereas the polymer product is withdrawn from the lower part of the reactor.

The polymerization system of a gas phase reactor used for polymerization of α-olefins typically comprises the polymer together with a high yield (Ziegler-Natta) catalyst and a gaseous reaction medium. It can be maintained in the fluidized state by mechanically mixing or stirring the contents of the reaction and additionally or alternatively by blowing the monomer (i.e. the olefin) and/or an easily volatile hydrocarbon (the reaction medium) into it in the gaseous state. A reaction medium in the liquid state can be introduced into the polymerization system and the polymerization can be carried out while gasifying said reaction medium. The unreacted reaction medium can be partly or wholly liquefied and recycled in liquid state into the polymerization system, as disclosed in EP-A1 0 024 933.

Conventional gas phase technology is hampered by some considerable problems. Thus, in a gas phase reactor the production rate is. limited due to low heat transfer from polymer to gas. Furthermore, when a highly active catalyst is used for polymerization in the gas phase, it is difficult to provide a uniform mixture of polymer particles in a gas phase polymerization bed.

Based on the operation conditions of gas phase reactors typical of those reported in the literature (as shown in simulations), the gas is not ideal at the pressure and temperature used, Ray et.al., *Chein.Eng.Sci.*, Vol 51, No. 21, pp. 4859–4886, 1996. For propylene the concentration at the catalyst site is higher than the bulk fluid as indicated by the sorption factor.

Further, blocking of the polymer particles occurs easily in the gas phase reactors as does powderization of the polymer particles by friction between them incident to forced agitation. The polymer adheres to the reactor wall, and entrainment of catalyst components or the resulting polymer may take place during conventional operation of gas phase reactors.

Some solutions to the above problems have been suggested in the art. For instance, the heat transfer can be improved by spraying an inert hydrocarbon or monomer liquid into the fluid bed; the evaporation of the liquid consumes the polymerization heat. The excess of the cooling medium can them be condensed and fed back to the reactor, as taught in U.S. Pat. No. 4,012,573.

Also in use is a fluidised gas phase reactor described in FI Patent No. 921632 and PCT/FI94/00571 with height/diameter ratio typically in the range of 4:1 or more and having an optional mechanical mixing means, e.g., like in FI Patent No. 935856 and/or gas distribution like in FI Patent No. 921 632.

It is also possible to separate the condensed monomer and light hydrocarbons in a knock-out drum, and to feed them in liquid form back to the fluid bed reactor with special nozzles in order to provide improved levels of productivity, as disclosed in WO 94/28032. The liquid is recycled to the lower part of the fluidized bed, about 50 to 70 cm above the fluidization grid to a zone, wherein the temperature profile is already stabilized. In this prior art fluid bed reactor the gas velocity is in range from 0.5 to 0.7 m/sec. The amount of liquid recycled is, e.g., for high activity Ziegler-Natta polymerization, 0.5 to 1.5 $m^3$ monomer/$m^3$ polymer bed per hour, and 5 to 15% liquid of the circulation gas weight. The liquid is introduced in the polymer bed in the form of liquid/gas jets which are directed substantially horizontally into the bed. The two phase flow contains 5 to 25% liquid in the form of 2000 to 4000 micron droplets. The preferred number of injection means is four, or 2 to 3 nozzles per 10 $m^2$ of fluid bed. The nozzle has to provide the liquid high enough horizontal momentum, of at least 100,000 to 200,000 (kg/s $m^2$)(m/s) depending on the nozzle type, particularly preferably 300,000 to 500,000 (kg/s $m^2$)(m/s). The nozzles are located in horizontal direction at an angle not greater than 45°, in particular not more than 20° to the horizontal plane.

There is no suggestion either in WO 94/28032 or in U.S. Pat. No. 4,740,550 that the feed system of WO 94/28032, or any other specific feed system, for that matter, could be used for introducing the slurry from a bulk polymerization reactor into a gas fluidized bed reactor.

SUMMARY OF THE INVENTION

It is an object of the present invention to increase the once-through conversion of a process comprising at least one slurry and at least one gas phase reactor and thereafter to minimize the circulation rate by using a direct feed line from the slurry reactor into the gas phase reactor bed.

It is another object of the invention to provide a process with a largest possible variety of different homopolymer and copolymer products of olefins, in particular propylene.

These and other objects, together with the advantages thereof over known processes, which shall become apparent from the text which follows, are accomplished by the invention as hereinafter described and claimed.

In a mechanically mixed gas phase reactor, the gas fluidized bed comprises two bed zones, one on top of the other. The bed zones have different flow patterns. Thus, generally the upper bed zone (in the following also called the "first bed zone") has an essentially upward directed flow pattern immediately adjacent to the central axis of the reactor, whereas the lower bed zone ("second bed zone") has a downward directed flow pattern immediately adjacent to the central axis of the reactor.

The present invention is based on withdrawing from a slurry reactor a multi-phase stream comprising living polymerization product and liquid and/or gaseous reaction medium and directly feeding that multi-phase stream using at least one feed line into a gas phase reactor below, preferably significantly below, the fluid bed surface of the first fluidized zone of the gas phase reactor in order to increase the once-through conversion of the process.

More specifically, the process according to the present invention is mainly characterized by a method of introducing polymer slurry obtained from a slurry reactor into a gas phase reactor containing a fluidized bed (C,D) with a first fluidized zone (C) on top of a second fluidized zone (D), said fluidized zones having different flow patterns, comprising the steps of conducting the content of the slurry reactor (R1) directly to the fluidized bed reactor (R2) as a multi-phase stream comprising polymer and active catalyst together with reaction medium as a downward directed flow using at least one feed line (10; 11), which protrudes substantially downwards into the fluidized bed (C, D), or as an upward directed flow using at least one feed line (12), which protrudes substantially upwards from the bottom of the gas phase reactor into the fluidized bed (C, D), and feeding the stream below the fluid bed surface (L) of the first fluidized zone (C) of the gas phase reactor in order to increase the once-through conversion of the process.

The apparatus according to the present invention comprises a reactor cascade formed by at least one slurry reactor connected in series with at least one gas phase reactor together with a conduit interconnecting said one slurry reactor with said one gas phase reactor for conducting essentially all of the unreacted monomers from the slurry reactor to the gas phase reactor. The conduit is connected to an inlet pipe of the gas phase reactor, which protrudes into the fluidized bed of the gas phase reactor so that the unreacted monomers can be fed below the fluid bed surface of the first fluidized zone in the form of flow directed towards the second bed zone, into the interface region between the first and the second fluidized beds or into the second bed zone.

The apparatus for preparing olefinic homopolymers and copolymers, comprising at least one slurry reactor (R1) and at least one gas phase reactor (R2), arranged in series to form a cascade, a fluidized bed (C, D) arranged within the gas phase reactor (R2), said fluidized bed comprising a first fluidized zone (C) on top of a second fluidized zone, said fluidized zones having different flow patterns, and a conduit (10, 11, 12) interconnecting at least one slurry reactor with at least one gas phase reactor for conducting essentially all of the unreacted monomers from the slurry reactor (R1) to the gas phase reactor (R2), said conduit being connected to an inlet pipe of the gas phase reactor, which protrudes substantially downwards or substantially upwards from the bottom of the gas phase reactor into the fluidized bed (C, D) of the gas phase reactor so that the unreacted monomers can be fed below the surface of the fluid bed surface (L) of the first fluidized zone.

By means of the invention, the amount of unreacted monomers which needs to be recirculated is minimized. The advantages obtained herewith are two-fold: investment and operation costs of the recovery section are greatly reduced and this also allows for more independent control of the composition of the first two reactors since very little reaction medium from second reactor is recirculated back to the first reactor.

The novel invention makes it possible to transfer the slurry of living polymer and high monomer content into the fluidized reactor bed. That will allow for the following advantages:

The loop reactor dynamics in the cascade provides fast transitions. Also fast start-ups are possible because gas phase bed material is available directly from the loop reactor. As a result, the present method provides highest possible flexibility.

The flexibility is based on the combination of loop and gas phase process advantages, which are possible only when feeding the polymer slurry into the gas phase reactor fluid bed. The novel invention makes it possible efficiently to contact monomers with catalyst using short residence times, and it provides for polymerization of a wide variety of different copolymers, with no typical solubility problems like in slurry process flash product recovery. The gas phase reactor(s) provides high flexibility in the reaction rate ratio between the first and second part of the product because of adjustable bed level and reaction rate.

In the process comprising at least one slurry and at least one gas phase reactor, the cooling capacity in the first gas phase reactor is not found to be critical in the case of preparing homopolymers and copolymers of propylene. In a preferred embodiment, the production split between the slurry reactor and gas phase reactor(s) is 65:35–50:50 or less, when the slurry contains polymer up to 50 weight percent and the gas phase residence time is short but it still consumes all or nearly all the monomer without recycling back to the slurry reactor. This can be achieved when the gas phase reactivity is high enough.

High enough gas phase activity can be achieved when the highest possible monomer concentration is provided and the catalyst poisons are not concentrated in the active centers of the living polymer particles. This may otherwise happen during flashing in, e.g., flash drum before the living polymer is fed into the next reactor.

It is an additional advantage that the polymerising polymer does not have to be dried in the flash tank. Similarly, the reaction does not have to be stopped after the slurry reactor before entering the gas phase. Dry polymer in a flash tank is under mechanical stress which easily breaks the polymer.

Next, the invention will be examined in more closely with reference to the following detailed description and two working examples.

DETAILED DESCRIPTION OF THE INVENTION

Definitions

Figure 1:
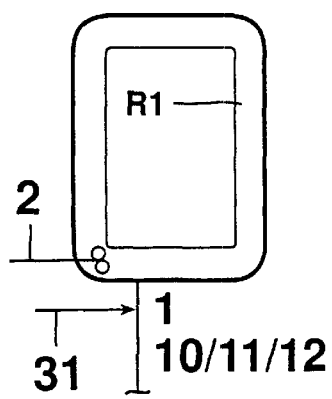
FIG. 1 shows the sideview of a loop reactor.

For the purpose of the present invention, "slurry reactor" stands for any reactor, e.g. a continuous or simple stirred tank reactor or loop reactor, operating in bulk or slurry and in which the polymer is formed in particulate form. "Bulk" stands for polymerization in a reaction medium that comprises at least 60 weight % monomer. In the present invention, the slurry reactor is preferably a bulk loop reactor.

"Gas phase reactor" designates any mechanically mixed or fluid bed reactor. Preferably, the gas phase reactor comprises a mechanically agitated fluid bed reactor with gas velocities of at least 0.2 m/sec. Preferred fluidized reactor designs are described in FI Patent No. 921632 and PCT/FI9400571.

By "super critical polymerization" is meant polymerization that takes place above the corresponding critical temperature and pressure of the reaction medium. Particularly, for propylene supercritical bulk polymerization according to FI Patent Application No. 954814 is carried out.

The expression "direct feed" stands for a process wherein the content of a slurry reactor, i.e. the polymerization product and reaction medium, is led directly to the gas phase reactor fluidized bed.

"Slurry" means the contents of a slurry reactor.

By "living polymer" is meant a product from the slurry reactor, at least 10 weight present of the production, containing active catalyst component polymerizing or capable of polymerizing when introduced into a monomer-containing reaction medium. The expression "polymer and active catalyst" is also used to designate the same product.

The "horizontal momentum flux" is defined as the mass low rate of liquid (kilograms per second) in the horizontal direction per unit cross-sectional area (square meters) of the inlet, multiplied by the horizontal component of the velocity (meters per second) of the inlet stream.

The overall process

The present invention relates to a continuous polymerization process in which olefin monomers are polymerized in the presence of a catalyst to provide polymerization products. The preferred catalyst system used comprises a high yield Ziegler-Natta catalyst having catalyst component, a co-catalyst component, an external donor and, optionally, an internal donor. Another preferred catalyst system is a metallocene catalyst. However, the polymerization catalyst used can be a catalyst of any other type provided it achieves an adequate activity at elevated temperature.

The polymerization temperature for homopolymers is at least 80° C. and for copolymers at least 60° C. The slurry reactor is operated at elevated pressure at least 35 barg up to 100 barg, and the gas phase reactor(s) at least 10 barg. Alternatively any reactor of the reactors in the series can be operated above the critical temperature and pressure.

The monomers used comprise at least one $C_2$ to $C_{16}$ olefin, e.g. ethylene, propylene, 1-butene, 4-methyl-1-pentene, 1-hexene, dienes, or cyclic olefins. In case of copolymerization at least one other $C_2$ to $C_{16}$ olefin, such as ethylene, propylene, 1-butene, 4-methyl-1-pentene, 1-hexene, a diene, or cyclic olefin, is used. The monomers are subjected to polymerization in a plurality of polymerization reactors connected in series, and the optional olefin(s) can be used in any of the reactors. Different amounts of hydrogen can be used as a molecular mass modifier or regulator in any or every reactor.

The invention is based on a combination of, in order, at least one slurry reactor and at least one gas phase reactor connected in series. This ordered combination is called a cascade. The content of the slurry reactor, the polymerization product and the reaction medium, is led directly into the fluidized bed reactor. The slurry reactor is preferably a bulk loop reactor, whereas the gas phase reactor can be fluidized bed reactor of any conventional design, Preferred gas phase reactors are those described in FI 921632 and PCT/FI94/00571. The polymerization reaction takes place in the presence of a catalyst at elevated temperature and pressure.

The slurry of the loop reactor enters the gas phase reactor as a three-phase flow comprising living polymer, polymerization medium in liquid and in gaseous form. Alternatively, the flow can be a two-phase flow comprising the living polymer and polymerization medium in gaseous form. The slurry is introduced into the fluidized bed below the bed level and above a possible mixing device. The mixing device is described in, e.g., FI 933073.

The gas velocity ($v_1$) in the fluidized bed is at least 0.2 m/sec, preferably 0.2 to 0.6 m/sec, and in particular about 0.35 m/sec (1 ft/sec). A velocity lower than the preferred gas velocity in the bed may cause local thermal instability because the fluidzed bed is not well mixed. Velocities higher than the upper limit indicated above, may give rise to fines separation in the circulation gas stream. The energy consumption of the gas circulation becomes also excessively high.

The preferred embodiments of the invention are depicted in the attached drawings.

Reference numerals R1 and R2 refer to a loop reactor and a gas phase reactor, respectively. Numerals A, L and G used in connection with the gas phase reactor refer to the central axis of the reactor, to the surface of the fluidized bed and to the fluidization grid, respectively.

The loop reactor includes a mechanical mixer 2 which provides for circulation of the reaction medium within the loop R1. A slurry containing living polymer and gaseous and/or liquid reaction medium is withdrawn from the loop reactor R1 via outlet 1 and fed into the gas phase reactor R2. A preferred arrangement is to provide at least one, alternatively more, slurry direct feed line(s) 10, 11 or 12 to the reactor, and preferably number of direct inlets is in the range 0.5 to 2 per 10 square metre. If a multi-line slurry reactor outlet 1 is used, described for example in our copending applications FI 971367 and FI-971368, the outlet lines can be combined into one direct feed line connected to the gas phase as described below. Alternatively every outlet of a multi-line outlet system can be separately connected to the gas phase and operating as a direct feed line. Flow in the direct feed line is preferably continuous and, thus, the outlet system used is continuous or semicontinuous.

The direct feed line(s) connected to the gas phase reactor can be optionally jacketed and heated by steam. The length of a direct feed line compared to the inner diameter of the direct feed line in the beginning of the line is range 270 to 3200, preferably 800 to 1500. The direct feed line inner diameter is equal for the whole length or, alternatively, the diameter increases 1.5 to 5 times, preferably less than 3 times of the inner diameter in the beginning of the line. In the direct feed line there is a time period of a passing wave for an equilibrium distribution of energy to occur. This is the case for single wave (zero frequency) wave propagation.

The slurry is introduced into the gas phase reactor R2 without any nozzle. The slurry entering the gas phase reactor as a three phase flow comprising living polymer, polymerization medium in liquid and in gaseous form. Alternatively the flow can be a two phase flow comprising living polymer and polymerization medium in gaseous form, containing typically less than 5 percent atomised liquid. The slurry is introduced preferably in the fluidized bed below the bed level and above a possible mixing device 23 e.g. described in FI 933073, or above the gas distribution grid G. The horizontal momentum flux of the entering slurry is less than $100 \times 10^3$ kg $s^{-1} m^{-2} \times m$ $s^{-1}$, which in the case of three phase flow gives for the polymer particles high enough impulse momentum to penetrate the fluidized bed. Too high momentum, say more than $300 \times 10^3$ kg $s^{-1} m^{-2} \times m$ $s^{-1}$, will cause severe disturbance in the fluidized bed flow pattern and the polymer particles coming in the fluidized bed can break through the polymer bed on the reactor wall or in the reactor volume above the fluidized bed.

The inlet point(s) are preferably arranged such that they protrude substantially down into the fluidized bed. The feed line 10 is arranged in a 30–75 degree, preferably 45–55 degree angle to the horizontal plane $A_1$. All this is made in order to follow the down flow pattern near the reactor wall and avoid a sudden blowing the polymer in the gas phase conical section and above. Alternatively the inlet can be located vertical above the gas distribution grid. This means actually two separate alternatives: direct feed line(s) 11 coming down from the top of the reactor below the bed level (preferably in the flow pattern down), or direct feed line(s) 12 coming up above the gas distribution grid (preferably in the flow pattern up). The inlet point(s) are also preferably arranged at angle of 0–90 degrees, especially for non-vertical lines preferably 15–50 degrees, most preferably 40 degrees to the line between the reactor wall. connecting point and the reactor centre $A_2$. This arrangement prevents the inlet polymer from penetrating the bed and reaching directly the opposite side of the reactor wall.

Figure 2:
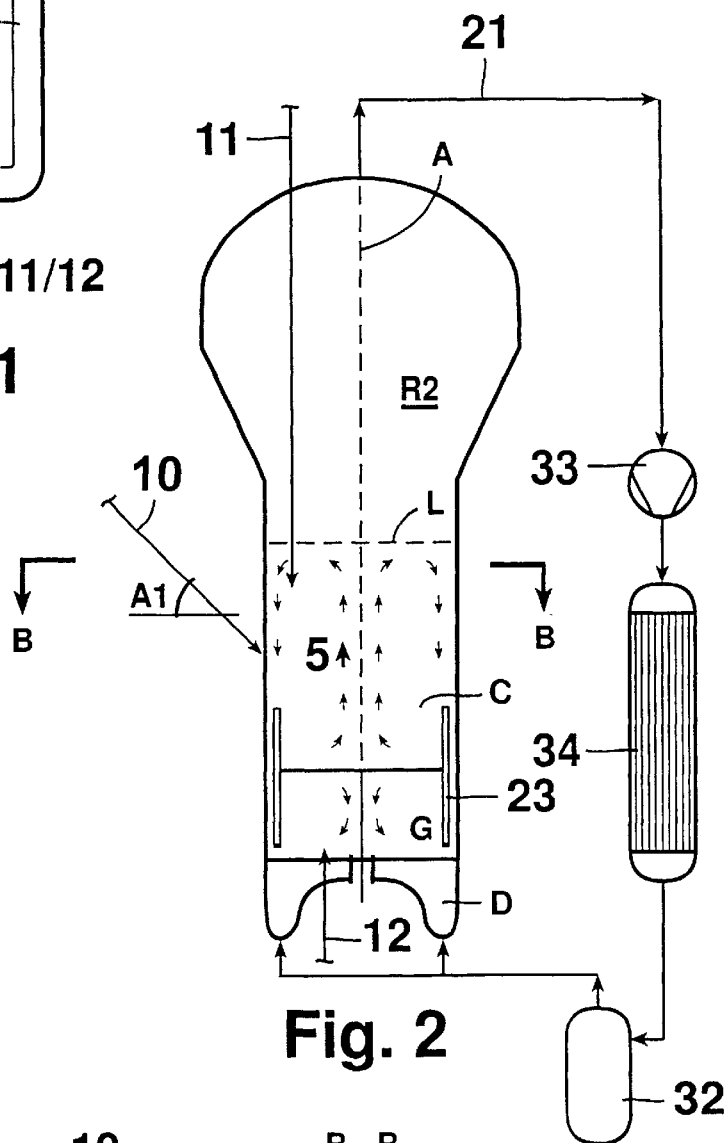
FIG. 2 shows a sectional sideview of a gas phase reactor provided with an inlet pipe arrangement according to the invention.
Figure 3:
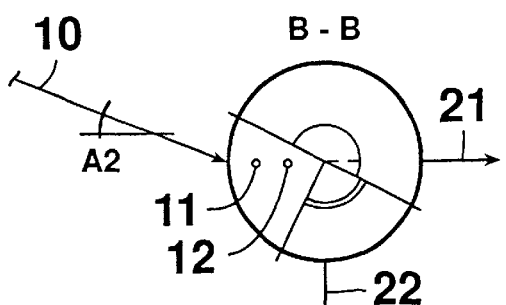
FIG. 3 shows section B—B of FIG. 2.

Optionally, to keep the direct feed line open and to provide a momentum for the living polymer enough to penetrate the fluidized bed an additional proportion of light hydrocarbon can be fed in the beginning of the direct feed line 11. The light hydrocarbon can be the monomer, comonomer, or inert component, or mixture of these, preferably having the actual gas composition of the gas phase reactor or some composition like that enriched by condensable fractions, most preferably a fraction condensed (in condenser 32) from the gas phase circulation stream 21. The circulation line can be provided with a compressor 33 and a heat exchanger 34, as shown in FIG. 2.

Typical rates of liquid introduction in the direct feed line are in the range of 0.01 to 10, preferably 0.1 to 0.5 and in particular 0.2 to 0.3 cubic meters of liquid per cubic metre of bed material per hour. Rates lower than the preferred rates have only insignificant effect on the direct feed line operation, while the line is not efficiently cooled for adequately slow down the living polymer reaction in the direct feed line and the three phase flow is too slow allowing the fouling of the direct feed line. Higher feed rates than mentioned may cool down the fluid bed reactor unnecessarily and stop the polymerization reaction. The weight ratio of liquid entering the direct feed line to the total gas in the gas phase circulation has to be in range 0.02 to 0.06 in order to prevent overcooling and possible freezing of the direct feed line with some polymers with extensive amounts of solubles.

There are discontinuous or preferably continuous outlet system(s) 21, preferably two or more (at least one spare), at least 120 degree, preferably in range 180 to 270 degree from the inlet point of the last direct feed line to the direction of mixer rotation. There is also an additional batch-wise outlet 22 preferably in range 60 to 20 degree after the last direct feed inlet point in order to remove possible lumps.

During start up, the slurry can be introduced above the bed level L.

The following non-limiting examples illustrate the invention:

EXAMPLE 1

Full scale simulation

A production scale plant was simulated to produce continuously PP-homopolymer. The plant comprises a catalyst, alkyl, donor, propylene feed systems, prepolymerization reactor, loop reactor and a fluidized bed gas phase reactor (GPR).

Catalyst, alkyl, donor and propylene were fed to prepolymerization reactor. The polymer slurry from the prepolymerization reactor was fed to a loop reactor in which also hydrogen and more propylene was fed. The polymer slurry from the loop reactor was fed to the GPR. The production in the reactors were 300 kg/h in prepolymerization, 15 t/h in loop and 10 t/h in the GPR.

The prepolymerization loop reactor was operated at a pressure of 56 bar and a temperature of 20° C. The loop reactor was operated at a pressure of 55 bar and a temperature of 80° C. Conversion in loop reactor was 50%.

The GPR was operated at a pressure of 35 bar and a temperature of 80° C. The line between the loop and the GPR had a control valve, in the beginning (40 m) the inner diameter was 1½" and the diameter of the last 10 m of the pipe was 3". 50% of the liquid propene was vaporized in the line. The velocity in the GPR inlet was calculated to be 11 m/s.

EXAMPLE 2

Pilot Scale Test

A pilot plant operated continuously was used to produce PP-homopolymer. The plant comprised feed systems for the catalyst, alkyl, donor and propylene, a prepolymerization reactor, a loop reactor and a fluidized bed gas phase reactor (GPR). Said catalyst, alkyl, donor and propylene components were fed to the prepolymerization reactor.

The polymer slurry from the prepolymerization reactor was fed to a loop reactor to which also hydrogen and more propylene was fed. The polymer slurry from the loop reactor was fed intermittently to the GPR via a 1" line.

The formed polymer and unreacted propylene where separated after removal from the GPR.

The catalyst used was a highly active and stereospecific ZN-catalyst made according to U.S. Pat. No. 5,234,879. The catalyst was contacted with triethylaluminium (TEA) and dicyclopentyldimethoxysilane (DCPDMS) (Al/Ti ratio was 150 and Al/Do 10 (mole)) before feeding to the prepolymerization reactor.

The catalyst was fed according to U.S. Pat. No. 5,385,992 and was flushed with propylene to the prepolymerization reactor. The prepolymerization reactor was operated at a pressure of 41 bar, a temperature of 20° C. temperature and a mean residence time of the catalyst amounting to 5 min.

The prepolymerized catalyst propylene and other components were transferred to the loop reactor. The loop reactor was operated at a pressure of 40 bar and a temperature of 75° C. The conversion was 33% and the mean residence time of the catalyst 2 h.

The polymer slurry from the loop reactor was transferred to the GPR. The GPR reactor was operated at a total pressure of 29 bar and a 21 bar partial pressure of propylene, a temperature of 75° C. and a mean residence time of the catalyst amounting to 2 h. The production split was 1% in prepolymerization, 60% in loop and 39% in GPR.

50% of the propene was vaporized in line between loop and GPR. The highest velocity in end of the line was 26 m/s and the highest mass flow 1.5 kg/s.

What is claimed is:

1. A method of introducing polymer slurry obtained from a slurry reactor into a gas phase reactor containing a fluidized bed (C, D) with a first fluidized zone (C) on top of a second fluidized zone (D), said fluidized zones having different flow patterns, comprising the steps of conducting the content of the slurry reactor (R1) directly to the fluidized bed reactor (R2) as a multi-phase stream comprising polymer and active catalyst together with reaction medium as a downward directed flow using at least one feed line (10; 11), which protrudes substantially downwards into the fluidized bed (C, D), or as an upward directed flow using at least one feed line (12), which protrudes substantially upwards from the bottom of the gas phase reactor into the fluidized bed (C, D), and feeding the stream below the fluid bed surface (L) of the first fluidized zone (C) of the gas phase reactor in order to increase the once-through conversion of the process.

2. The method according to claim 1, wherein the stream is fed below the fluid bed surface (L) of the first fluidized zone (C) and above the second fluidized zone (D).

3. The method according to claim 2, wherein the gas phase reactor has an essentially vertical central axis (A) and wherein said first zone (C) has an essentially upward directed flow pattern adjacent to the central axis (A) and said second fluidized zone (D) has an essentially downward directed flow pattern adjacent to the central axis (A).

4. The method according to any of claims 1 to 3, wherein the multi-phase stream is continuously or semicontinuously withdrawn from the slurry reactor and fed into the gas phase reactor (R2).

5. The method according to claim 1, wherein the slurry is introduced into the gas phase reactor (R2) using a pipe essentially without restricting the flow with a nozzle.

6. The method according to claim 1, wherein the slurry is introduced using a horizontal momentum flux of less than $100 \times 10^3$ kg s$^{-1}$m$^2$×m s$^{-1}$.

7. The method according to claim 1, wherein the multi-phase stream is introduced into the reactor at an angle of 30 to 75 to the horizontal plane ($A_1$).

8. The method according to claim 1, wherein the multi-phase stream is introduced into the reactor via an inlet in the reactor wall at a point between the top and the bottom of the reactor at an angle of 0 to 90 in the horizontal plane to a line connecting said point and the central axis of the reactor.

9. The method according to claim 1, wherein the slurry is fed into the gas phase reactor (R2) as a three phase flow comprising polymer, active catalyst, polymerization medium in liquid and in gaseous form.

10. The method according to claim 1, wherein the slurry is fed into the gas phase reactor (R2) as a three phase flow comprising polymer, active catalyst and polymerization medium in gaseous form containing less than 5 percent atomised liquid.

11. The method according to claim 1, wherein the multiphase stream is a three phase stream, and wherein a light hydrocarbon is used as a carrier for providing the polymer and active catalyst of the three-phase stream with enough momentum for penetration of the fluidized bed (C, D).

12. The method according to claim 10, wherein the polymer introduced into the gas phase reactor is a living polymer that is introduced into the gas phase reactor using an open direct feed line by feeding a light hydrocarbon selected from the group of monomer, comonomer, inert hydrocarbons and a mixture thereof, into the inlet of the direct feed line (31).

13. The method according to the claim 12, wherein the light hydrocarbon used has the same composition as the gas phase of the gas phase reactor and it is optionally enriched with condensable fractions.

14. The method according to the claim 12, wherein the light hydrocarbon is a fraction condensed from the gas phase circulation stream (32).

15. The method according to claim 14, wherein the liquid is introduced into the direct feed line at a rate of 0.1 to 0.5 cubic meters of liquid per cubic meter of bed material per hour.

16. The method according to claim 15, wherein the weight ratio of liquid entering the direct feed line to the total gas in the gas phase circulation is in the range of 0.02 to 0.05.

17. The method according to claim 1, wherein a continuous outlet system (21) is at least 120 degrees, from the inlet point of a last direct feed line to a direction of mixer rotation.

18. The method according to claim 1, wherein the gas velocity ($v_1$): in the fluidized bed is at least 0.2 m/sec.

19. The method according to claim 1, wherein an olefinic homo- or copolymer is prepared.

20. Apparatus for preparing olefinic homopolymers and copolymers, which comprises
at least one slurry reactor (R1) and at least one gas phase reactor (R2), arranged in series to form a cascade,
a fluidized bed (C, D) arranged within the gas phase reactor (R2), said fluidized bed comprising a first fluidized zone (C) on top of a second fluidized zone, said fluidized zones having different flow patterns, and
a conduit (10, 11, 12) interconnecting at least one slurry reactor with at least one gas phase reactor for conducting essentially all of the unreacted monomers from the slurry reactor (R1) to the gas phase reactor (R2), said conduit being connected to an inlet pipe of the gas phase reactor, which protrudes substantially downwards or substantially upwards from the bottom of the gas phase reactor into the fluidized bed (C, D) of the gas phase reactor so that the unreacted monomers can be fed below the surface of the fluid bed surface (L) of the first fluidized zone.

21. The apparatus according to claim 20, wherein the inlet pipe is arranged so that it protrudes from the reactor wall substantially downwards into the fluidized bed at an angle greater than 45 degrees to the central axis, vertically below the fluid bed surface (L) (11) or above the gas distribution grid (G) (12).

22. The apparatus according to claim 20, wherein the conduit is connected to a multi-line slurry reactor outlet (01).

23. The apparatus according to claim 20, wherein there are a number of conduits (10–12) interconnecting the slurry reactor with the gas phase reactor.

24. The apparatus according to claim 23, wherein each conduit is connected to a multi-line outlet system of the slurry reactor.

25. The apparatus according to claim 20, wherein the length of each direct feed conduit compared to the inner diameter of the conduit in the beginning of the conduit line is in a range of 270 to 3200.

26. The apparatus according to claim 25, wherein the inner diameter of the direct feed conduit is equal throughout its whole length.

27. The apparatus according to claim 25, wherein the diameter of the direct feed conduit at the end of the conduit is 1.5 to 5 times the inner diameter in the beginning of the conduit line.

28. The apparatus according to any of claim 20, wherein the direct feed conduit (10, 11, 12) is provided with a steam jacket.

29. The apparatus according to claim 20, wherein the gas phase reactor is provided with 0.5 to 2 direct feed inlet(s) per 10 square meter.

30. The apparatus according to claim 29, wherein an additional batch-wise outlet (22) is arranged in the gas phase reactor at an angle in the horizontal plane amounting to 60 to 120 degrees after the last direct feed inlet point.

31. The method according to claim 7, wherein the multiphase stream is introduced into the reactor at an angle of 45 to 55° to the horizontal plane ($A_1$).

32. The method according to claim 8, wherein the multiphase stream is introduced into the reactor via an inlet in the reactor wall at a point between the top and the bottom of the reactor at an angle of 15 to 50° in the horizontal plane to a line connecting said point arid the central axis of the reactor.

33. The method according to claim 8, wherein the multiphase stream is introduced into the reactor via an inlet in the reactor wall at a point between the top and the bottom of the reactor at an angle of about 40° in the horizontal plane to a line connecting said point and the central axis of the reactor.

34. The method according to claim 15, wherein the liquid is introduced into the direct feed line at a rate of 0.2 to 0.3 cubic meter-s of liquid per cubic meter of bed material per hour.

35. The method according to claim 17, wherein a continuous outlet system (21) is in a range of 180 to 270° from the inlet point of a last direct feed line to a direction of mixer rotation.

36. The method according to claim 18, wherein the gas velocity ($v_1$) in the fluidized bed is 0.2–0.6 m/sec.

37. The method according to claim 18, wherein the gas velocity ($v_1$) in the fluidized bed is about 0.35 m/sec.

38. The apparatus according to claim 25, wherein the length of each direct feed conduit compared to the inner diameter of the conduit in the beginning of the conduit line is 800 to 1500.

39. The apparatus according to claim 27, wherein the diameter of the direct feed conduit at the end of the conduit is less than 3 times the inner diameter in the beginning of the conduit line.

40. The apparatus according to claim 29, wherein the gas phase reactor is provided with 1 direct feed inlet per 10 square meter.

41. The method according to claim 9, further comprising a liquid hydrocarbon fed into the fluidized bed (C, D) below the bed level (L) and above a mixing device (23).

42. The method according to claim 1, wherein a discontinuous outlet system (21) is at least 120 degrees from the inlet point of a last direct feed line to a direction of mixer rotation.

* * * * *